US007014199B2

(12) United States Patent
Hendzel

(10) Patent No.: US 7,014,199 B2
(45) Date of Patent: Mar. 21, 2006

(54) ADJUSTABLE MULTIPLE CONTAINER DEPLOYMENT CART

(75) Inventor: Louis J. Hendzel, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 76 days.

(21) Appl. No.: 10/309,924

(22) Filed: Dec. 4, 2002

(65) Prior Publication Data

US 2004/0108670 A1   Jun. 10, 2004

(51) Int. Cl.
B62B 11/00 (2006.01)
(52) U.S. Cl. ...................... 280/47.35; 248/97; 248/131
(58) Field of Classification Search ............. 280/47.35, 280/47.34, 47.18, 47.28, 47.29, 47.41, 47.11, 280/47.26, 79.5, 79.2, 79.3; 248/97, 100, 248/131; 211/126.2, 85.18
See application file for complete search history.

(56) References Cited

U.S. PATENT DOCUMENTS

| | | | | |
|---|---|---|---|---|
| 1,427,388 A | * | 8/1922 | Holley ...................... | 280/79.2 |
| 1,580,163 A | * | 4/1926 | Peterson et al. .............. | 248/97 |
| 2,421,221 A | | 5/1947 | Rothe | |
| 2,423,325 A | * | 7/1947 | Jones ......................... | 248/100 |
| 3,621,629 A | | 11/1971 | Wickersheim | |
| 3,698,155 A | | 10/1972 | Robinson | |
| 3,698,735 A | * | 10/1972 | Bloomfield et al. ..... | 280/47.35 |
| 4,332,378 A | | 6/1982 | Pryor | |
| 4,568,048 A | * | 2/1986 | Smedlund .................... | 248/97 |
| 4,576,350 A | * | 3/1986 | Bond .......................... | 248/97 |
| 4,743,040 A | * | 5/1988 | Breveglieri et al. ...... | 280/47.35 |
| 4,869,518 A | * | 9/1989 | Breveglierij et al. ..... | 280/47.35 |
| 4,899,968 A | * | 2/1990 | Eaglin et al. ............... | 248/131 |
| 4,923,202 A | * | 5/1990 | Breveglieri et al. ..... | 280/47.35 |
| 4,966,340 A | | 10/1990 | Hunter | |
| 5,050,743 A | | 9/1991 | Lazzarotti | |
| 5,456,431 A | * | 10/1995 | Ilnisky ....................... | 248/98 |
| 5,857,685 A | | 1/1999 | Phillips et al. | |
| 5,913,528 A | * | 6/1999 | Kresse et al. ............ | 280/47.35 |
| 6,019,381 A | | 2/2000 | Krawczyk | |
| 6,059,127 A | * | 5/2000 | Bennett ................... | 211/85.18 |
| 6,079,719 A | | 6/2000 | Tisbo et al. | |

* cited by examiner

Primary Examiner—Hau Phan
(74) Attorney, Agent, or Firm—Michael Best & Friedrich, LLP

(57) ABSTRACT

A sack cart comprising a frame adapted to support at least two sacks, where the frame is rotatable about a central axis passing through the frame, a rotation mechanism is coupled between the frame and a support surface that enables the frame to be rotated about the central axis, and at least one sack support arm is selectively movable to support the sack on the sack cart.

17 Claims, 6 Drawing Sheets

ADJUSTABLE MULTIPLE CONTAINER DEPLOYMENT CART

FIELD OF THE INVENTION

This invention relates generally to carts, and more particularly to carts that support containers containing sorted items.

BACKGROUND OF THE INVENTION

In a typical parcel sorting machine, parcels are sorted and dispensed into sacks for transport to their ultimate destination. The sorting process is typically automated to handle the high volumes of parcels that are processed daily. Nevertheless, human intervention is often required to maintain steady operation and processing of the parcels. Currently, a human operator is required to change out the sacks filled with processed parcels and replace them with new, empty sacks ready to be filled. The time required to perform this changeover often results in increased downtime of the sorting machine that further results in decreased parcel throughput. Typically, using currently available sack-supporting devices and methods, a sack changeover requires about one minute to perform. This amount of time can equate to a loss of throughput of hundreds of parcels.

Another problem associated with currently available sack supporting devices and methods is the inability to adjust to different size sacks. Different standard sizes of sacks are typically used in combination with parcel sorting machines by the United States Postal Service. Among those standard sizes of sacks, different heights also exist. Typically, the United States Postal Service uses sacks having openings between about 24-inches and 60-inches in perimeter, and between about 24-inches and 42-inches in height. Using currently available sack supporting devices and methods, adjusting the sack supporting devices may not even be possible; and if it is, the devices have to be reconfigured to adequately support the sack for continued sorting.

A further problem associated with currently available sack supporting devices and methods is that storage area is not provided for additional sacks used during changeover. Typically, a sorting machine operator is required to store additional sacks away from the sorting machine, resulting in additional inconvenience and downtime.

Yet another problem associated with currently available sack supporting devices and methods is the lack of supporting surfaces to accommodate different sack heights. Depending on the size of the sack, hundreds of pounds of parcels can be contained within a sack. In the standard sizes of sacks, multiple eyelets are fastened along the perimeter of the open end of the sack to mount the sack to the sack supporting device. Additional stress is placed upon the sack near the eyelets when supporting a heavy load of parcels via the eyelets only, compared to supporting the sack at its bottom. As a result, the useful lives of the sacks may be decreased due to fraying or tearing caused by inadequate supporting of the sacks.

SUMMARY OF THE INVENTION

The present invention solves some of the problems associated with the prior art by providing an adjustable multiple deployment cart supporting dual sacks or other containers in opposed relation.

The cart utilizes casters and preferably a symmetrical frame that is rotatable between positions, whereby a container is located in a first position to receive items from a sorting machine, and an empty container is queued in a second position awaiting to replace the container in the first position when it is filled. When the container in the first position is filled, the cart is rotated 180-degrees to replace the filled container with the empty container from the second position. Upon completing the rotation, the filled sack or other container may be removed and replaced with another empty sack or other container. This sequence is continuously repeated during operation of the sorting machine. The adjustable multiple container deployment cart and its method of use may decrease sorting machine downtime from about one minute (using currently available devices and methods) down to several seconds, which is about the time required to rotate the cart 180-degrees.

The cart also includes adjustable support arms extending from opposite sides of the frame to support the containers thereon. Two support arms extend from each side of the frame to support a container. On each side of the frame, a first support arm is affixed to the frame near the edge of the frame, and a second support arm located near the opposite edge of the frame is laterally adjusted to accommodate different sizes of containers. The second support arm is also laterally biased to tension the container opening upon mounting the container to the support arms. Also, both first and second support arms are longitudinally adjusted to accommodate different sizes of containers. Likewise, both first and second support arms are longitudinally biased to tension the container opening upon mounting the container to the support arms. The adjustable support arms allow the cart to support containers having openings between about 24-inches and 60-inches in perimeter, without any drastic reconfiguration or alterations to the cart components.

The support arms are also rotatable about their respective longitudinal axes and have a series of hooks mounted thereon to support the sacks or other containers. The support arms are rotatable about 90-degrees between positions of supporting the containers and releasing the containers. This allows a rapid changeover between filled containers and empty containers. Additional hooks are included on the cart to provide storage for additional empty containers.

Auxiliary support shelves are recessed within opposite sides of the frame and are pivotally hinged to the frame. The auxiliary support shelves may be deployed to support container sizes having a shorter length. By supporting the shorter containers at their bottoms, the stress near the eyelets or other mounting portion is substantially reduced and the useful lives of the containers is expected to be extended. When the containers having a longer length are used, the support shelves may be pivoted to recess within the frame.

BRIEF DESCRIPTION OF THE DRAWINGS

In the drawings, wherein like reference numerals indicate like parts.

Figure 1:
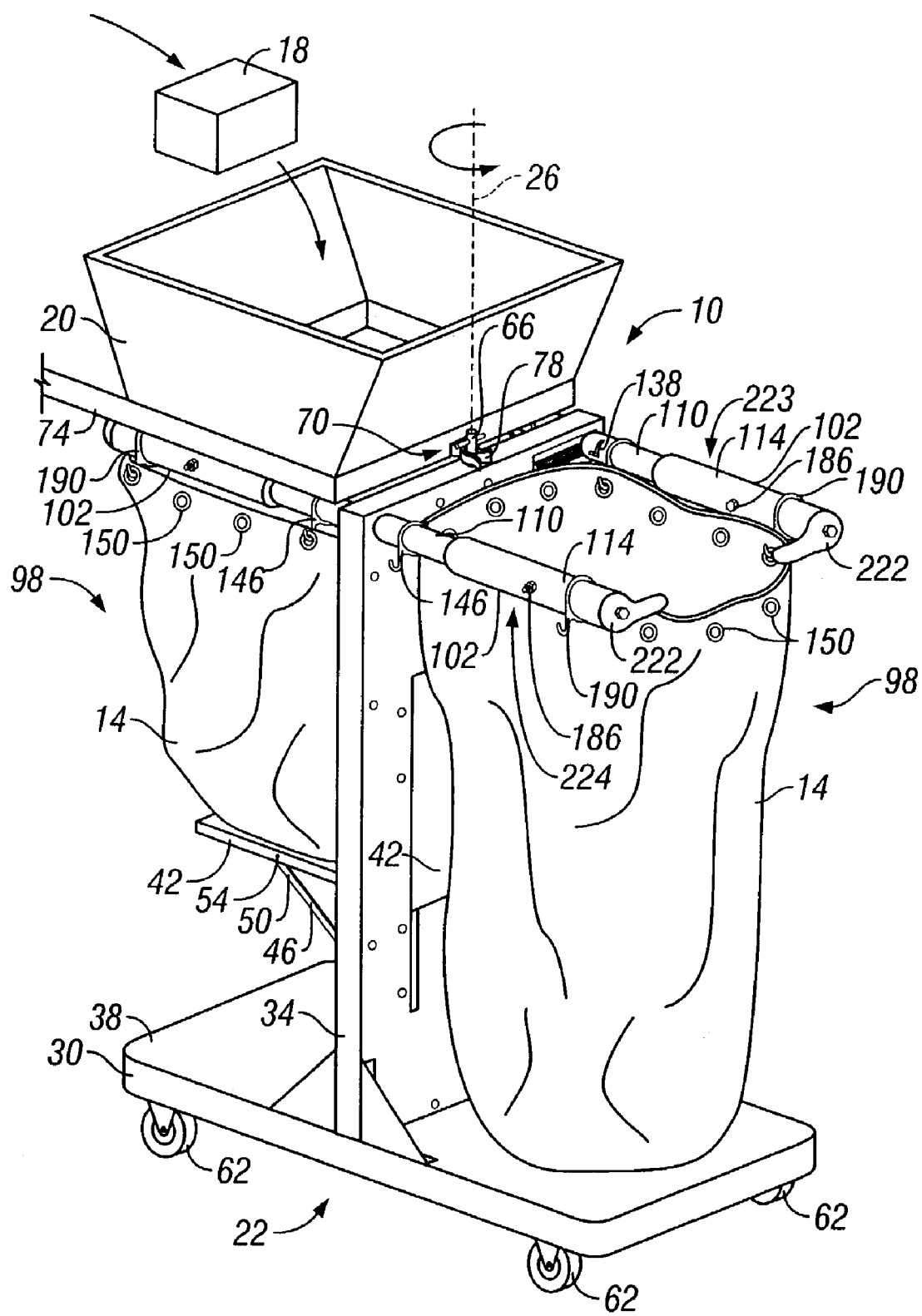
FIG. 1 is a perspective view of the cart embodying the present invention.

Before the embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION OF THE PREFERRED EMBODIMENTS

As shown in FIG. 1, one embodiment of the cart 10 of the present invention is shown supporting multiple sacks 14, whereby the sacks 14 are adapted to receive parcels 18 from a chute 20 of a parcel sorting machine (not shown). Although the preferred embodiment described herein uses sacks to hold parcels sorted by a postal sorting machine, it should be understood that the invention may be used with other types of containers in non-postal applications.

The cart 10 generally comprises a frame 22, like the inverted T-shaped frame 22 shown in FIG. 1, that allows multiple sacks 14 to be supported on the cart 10 and pivoted about a central axis 26 passing vertically through the cart 10. The pivoting action allows a filled sack 14 to be rotated away from the chute 20, and an empty sack 14 to be rotated toward the chute 20. In one embodiment of the present invention, the cart 10 supports two sacks 14, with one sack 14 being supported on each side of the frame 22, whereby the frame 22 comprises a platform 30 having a wall 34 projecting vertically therefrom. Alternatively, the cart 10 may be designed to support a larger number of sacks 14, while being pivotable about the central axis 26 passing vertically therethrough.

In one embodiment of the cart 10, the frame 22, including the platform 30 and the wall 34, is made from a series of sheet metal preforms (not shown) that are fastened together. The fastened interconnection between the preforms provides the main structural rigidity of the frame 22. The platform 30 also provides a support shelf 38 to support the weight of the sack 14 (when filled) when the sack 14 is supported from the cart 10. The wall's height is sized such that the weight of a 42-inch tall sack 14 is supported by the platform 30 when the sack 14 is supported from the cart 10. Alternatively, the wall's height may be taller so that the weight of the sack 14 is not supported by the platform 30.

Metals such as steel, stainless steel, or aluminum can be used separately or in combination to construct the frame 22. Cost, longevity, and weight, among others, are factors that influence material selection. Alternatively, the frame 22 may be made of non-metal materials such as wood, plastic, and composite materials.

The cart 10 further includes auxiliary support shelves 42 adapted to support shorter sacks 14 from the cart 10. The auxiliary support shelves 42 are positioned in the wall 34 of the cart 10 and are pivotally coupled to the wall 34. As a result, the auxiliary support shelves 42 pivot about 90-degrees between positions of deployment and retraction. Additionally, diagonal support members 46 attach to the shelves 42 at a first end 50 via a pinned joint 54, and attach to the wall 34 at a second end 58 via an ordinary pin and slot arrangement (not shown). Upon deployment and retraction, the second end 58 of the support members 46 slide via the pin and slot arrangement. The support members 46 lend structural rigidity to the auxiliary support shelves 42 when the shelves 42 are deployed.

The auxiliary support shelves 42 are positioned in the wall 34 of the frame 22 such that when deployed, the auxiliary support shelves 42 support the filled weight of a 24-inch tall sack 14. Upon retracting the auxiliary support shelves 42 into the wall 34 of the frame 22, the auxiliary support shelves 42 sit flush with the wall 34 so to not interfere with the cart's support of sacks 14 taller than 24-inches. Alternatively, the auxiliary support shelves 42 may be positioned in the wall 34 such that when deployed, the auxiliary support shelves 42 support the weight of a taller or shorter sack 14. Like the rest of the frame 22, the auxiliary support shelves 42 are preferably made from sheet metal, although other materials may be used.

As shown in FIG. 1, one embodiment of the cart 10 includes a rotation mechanism in the form of casters 62 coupled to the platform 30. The casters 62 allow the cart 10 to both translate and rotate relative to a support surface (not shown). The casters 62 are fastened to the platform 30 of the cart 10 using common hardware, such as nuts and bolts. Alternatively, the casters 62 may be welded, snap-fit, press-fit, or any other method of permanently or temporarily mounting the casters 62 to the platform 30.

The cart 10 further includes a pivot pin 66 coupled to the top surface of the vertical wall 34. A receiving portion 70 on some support structure 74 of the parcel sorting machine couples with the pivot pin 66 to substantially only allow the cart 10 to rotate about the central axis 26 as defined by the pivot pin 66. As shown in FIG. 1, the receiving portion 70 includes resiliently biased fingers 78 mounted to the support structure 74. To prepare the cart 10 for operation, the cart 10 is positioned relative to the parcel sorting machine such that the pivot pin 66 engages the resiliently biased fingers 78 on the support structure 74. Upon the pivot pin 66 engaging the fingers 78, the central axis 26 of rotation is established. During operation, a sack 14 supported by the cart 10 is aligned with the chute 20 of the parcel sorting machine such that the sack 14 receives parcels 18 from the parcel sorting machine. After the sack 14 has been filled, the cart 10 is rotated about the central axis 26 to remove the filled sack 14 from beneath the chute 20 and replace it with an empty sack 14 ready to receive parcels 18 from the chute 20. Alternatively, receiving portions 70 of different designs may be utilized to engage the pivot pin 66. An example of such receiving portion 70 includes, but is not limited to, a slot (not shown) in the support structure 74 having a locking mechanism (not shown) to engage the pivot pin 66.

Figure 2:
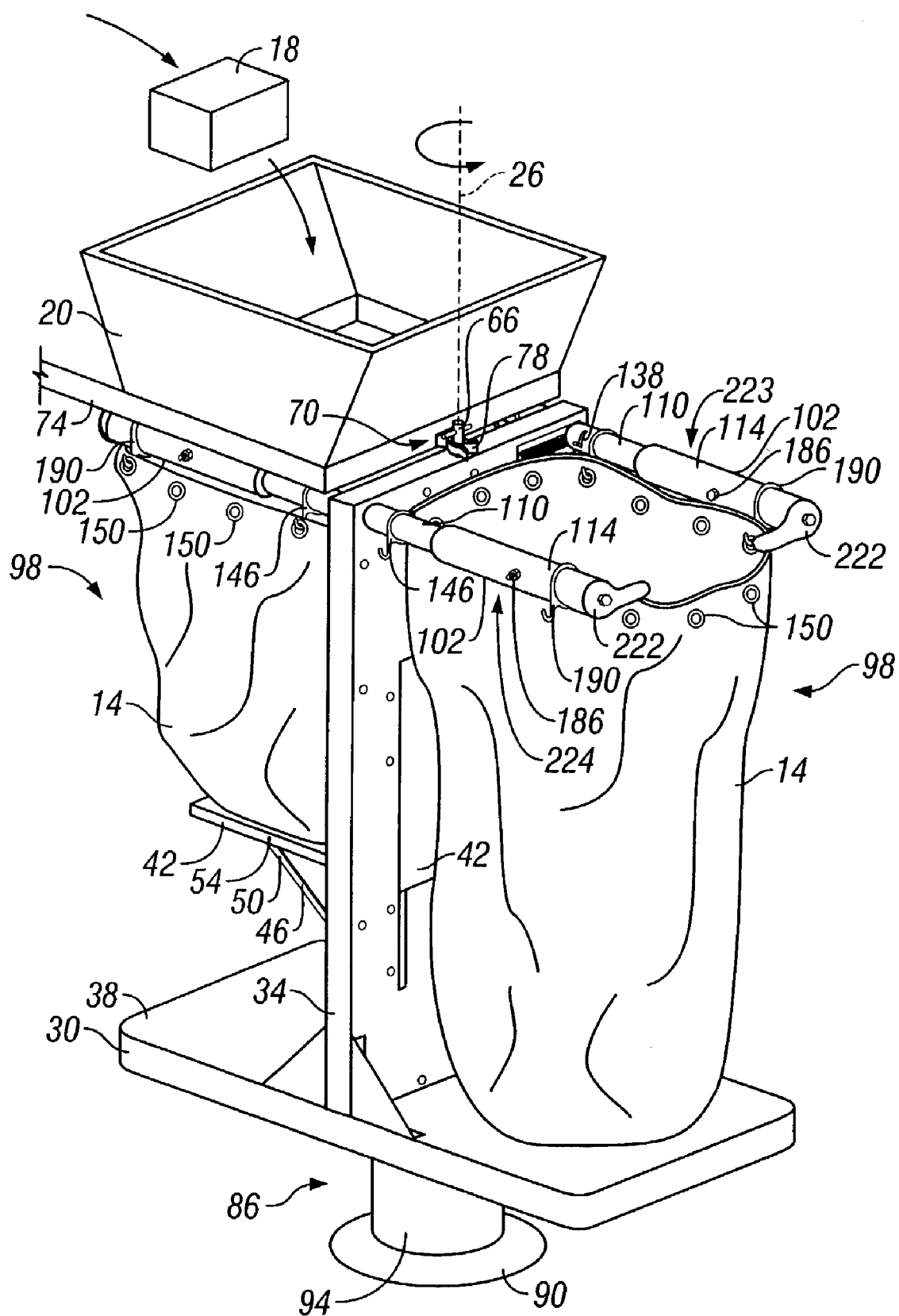
FIG. 2 is a perspective view of the cart including a different rotation device.

Alternatively, the cart 10 may include a rotation mechanism in the form of a rotatable stand 86 coupled to the platform 30 for rotation relative to the support surface. As shown in FIG. 2, the rotatable stand 86 may utilize a number of commonly known designs and components to provide rotation to the cart 10. The rotatable stand 86 includes a base 90, which provides the mounting surface of the cart 10 and is rotationally fixed relative to the support surface. The rotatable stand 86 also includes a pole 94 that is affixed to the bottom of the platform 30 and rotationally coupled with the base 90. As previously stated, a number of commonly known components may be utilized to provide the rotational joint between the pole 94 and the base 90, such as, for example, roller bearings, thrust bearings, bushings, low-friction sliding surfaces, etc. As shown in FIG. 2, the cart 10 is positioned relative to the parcel sorting machine such that the sacks 14 supported by the cart 10 are each able to receive parcels 18 from the chute 20 when the cart 10 is rotated. The pivot pin 66 is shown engaging the resiliently biased fingers 78 to provide alignment to the cart 10 relative to the chute 20. Alternatively, the rotatable stand 86 may be affixed to the support surface in a pre-determined position, such that the pivot pin 66 and fingers 78 are not required to align the cart 10 relative to the chute 20.

Figure 3B:
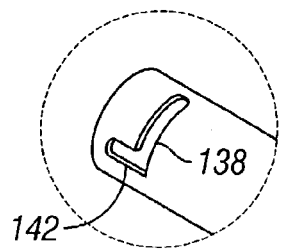
FIG. 3B is a reverse perspective view of the support arm of the cart of FIG. 1.
Figure 3A:
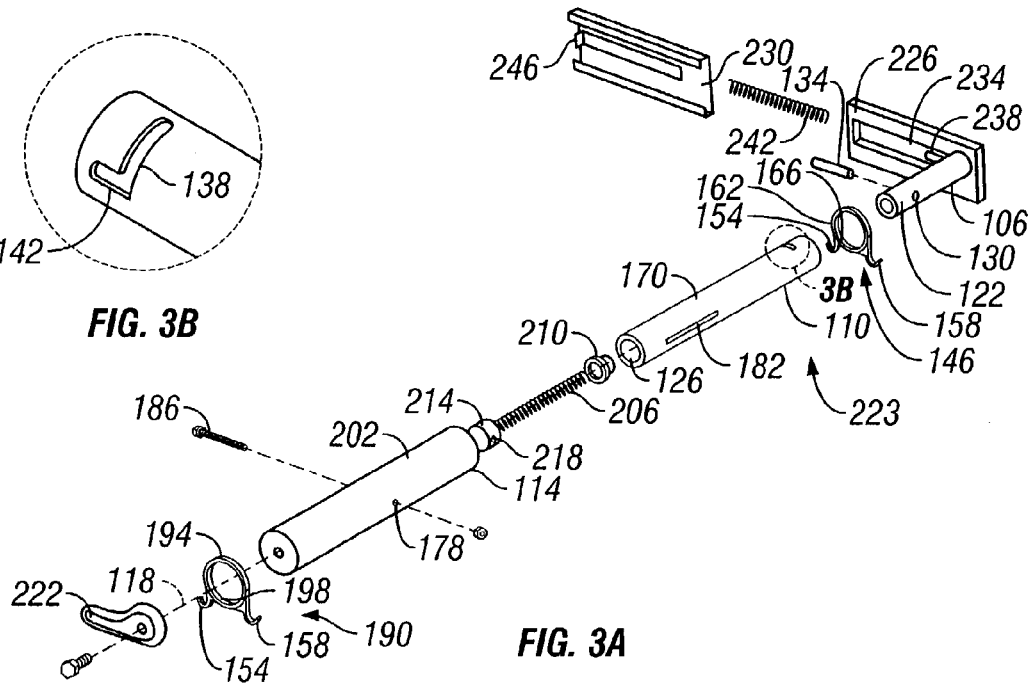
FIG. 3A is an exploded view of a support arm of the cart of FIG. 1.

In one embodiment of the cart 10, the frame 22 defines two parcel receiving stations 98, whereby each parcel receiving station 98 includes two sack support arms 102 projecting therefrom. As shown in FIG. 3A, each sack support arm 102 of each parcel receiving station 98 generally includes a base portion 106, a rotating portion 110, and a sliding portion 114. The base portion 106 is coupled to the wall 34 such that the base portion 106 extends substantially perpendicularly from the wall 34, thereby defining a longitudinal axis 118. Further, the base portion 106 is rotationally and axially fixed relative to the wall 34.

The base portion 106 includes an outer surface 122 capable of engaging an inner surface 126 of the rotating portion 110. The base portion 106 further includes a first aperture 130 therethrough for insertion of a first pin 134, wherein the rotating portion 110 includes a first slot 138 extending radially around the rotating portion 110, and the base portion 106 is inserted within the rotating portion 110 such that the first aperture 130 is exposed through the first slot 138. In turn, the first pin 134 is inserted through the first slot 138 and the base portion 106 to axially secure the rotating portion 110 to the base portion 106. The geometry of the first slot 138 allows the rotating portion 110 to rotate relative to the base portion 106 about the longitudinal axis 118. The first slot 138 is sized to allow about 90-degrees of rotation relative to the base portion 106 about the longitudinal axis 118. As shown in FIG. 3B, the first slot 138 further includes a notch 142 toward one end of the first slot 138 that extends substantially perpendicularly from the first slot 138. The notch 142 provides a locking mechanism for the rotating portion 110 such that the rotating portion 110 is rotationally fixed relative to the base portion 106 when the first pin 134 engages the notch 142.

As shown in FIG. 3A, the rotating portion 110 further includes a hook assembly 146 adapted to engage eyelets 150 of the sack 14. The hook assembly 146 includes a sack hook 154 that engages an eyelet 150 on the sack 14 for supporting the sack 14 on the cart 10. The hook assembly 146 further includes a storage hook 158, whereby empty sacks 14 are stored and kept readily available for use. In one embodiment of the cart 10, the hook assembly 146 is coupled to the rotating portion 110 via an insertion portion 162. As shown in FIG. 3, the insertion portion 162 includes an inner surface 166 sized to provide an interference fit with the outer surface 170 of the rotating portion 110. When interference-fit to the rotating portion 110, the hook assembly 146 rotates with the rotating portion 110 and is not allowed to rotate relative to the rotating portion 110.

Alternatively, the hook assembly 146 may be mounted anywhere along the sack support arms 102. In yet alternate constructions, the hook assembly 146 may be mounted anywhere on the cart 10 for the sole purpose of supporting and storing empty sacks 14. Alternatively, the hook assembly 146 may be fastened, glued, epoxied, welded, or integrally molded with the sack support arms 102, or any other method that securely mounts the hook assembly 146 to the sack support arms 102.

The outer surface 170 of the rotating portion 110 is capable of engaging the inner surface (not shown) of the sliding portion 114. The sliding portion 114 includes an aperture 178 therethrough capable of aligning with a second slot 182 provided in the rotating portion 110. The second slot 182 is elongated along the longitudinal axis 118 to allow movement of the sliding portion 114 along the longitudinal axis 118 when a second pin 186 is inserted through the aperture 178 and second slot 182, thereby rotationally fixing the sliding portion 114 relative to the rotating portion 110. As a result, the sliding portion 114 is capable of about 4 inches of telescopic engagement with the rotating portion 110. Alternatively, the second slot 182 may be sized to allow more or less telescopic engagement. The sliding portion 114 further includes a hook assembly 190, substantially similar to the hook assembly 146 as previously described. However, the insertion portion 194 includes an inner surface 198 sized to provide an interference fit with the outer surface 202 of the sliding portion 114. When interference-fit to the sliding portion 114, the hook assembly 190 rotates with the sliding portion 114 and is not allowed to rotate relative to the sliding portion 114.

As shown in FIG. 3A, a longitudinal compression spring 206 is disposed between the base portion 106 and the second pin 186 to resiliently bias the sliding portion 114 along the longitudinal axis 118. A spring pocket 210 is inserted within the base portion 106 to provide a pocket for positioning the compression spring 206 therein. A spring bushing 214 is provided on the other side of the compression spring 206 to center the spring 206 within the rotating portion 110 and to provide a biasing surface with which to act against the second pin 186. The spring bushing 214 further includes a bore 218 therethrough, the second pin 186 being inserted through both the sliding portion 114 and the bore 218 to secure the compression spring 206 between the spring pocket 210 and the spring bushing 214. As a result, the action of the compression spring 206 resiliently biases the sliding portion 114 along the longitudinal axis 118 and away from the rotating portion 110.

As shown in FIGS. 1–6, each sack support arm 102 further includes a handle 222 coupled to the end of the sliding portion 114 to provide leverage for moving the rotating portion 110 and sliding portion 114. Each handle 222 is fastened to the end of the sliding portion 114 such that the handle 222 is rotatably fixed relative to the sliding portion 114. Alternatively, the handle 22 may be press fit, glued, epoxied, welded, or integrally molded with the sliding portion 114, or any other method that securely mounts the handle 22 to the sliding portion 114 may be used.

The components of the sack support arms 102, including the rotating portions 110, sliding portions 114, hook assemblies 146, 190, and handle 222, are preferably made from plastic. Plastic typically allows for a lightweight and less expensive end product. The base portion 106, however, is preferably made from a metal, such as steel or aluminum. Alternatively, the components of the sack support arms 102 may be made from metal, such as, among others, steel, stainless steel, and aluminum. The components of the sack support arms 102 may also be made from a composite material.

Figure 4:
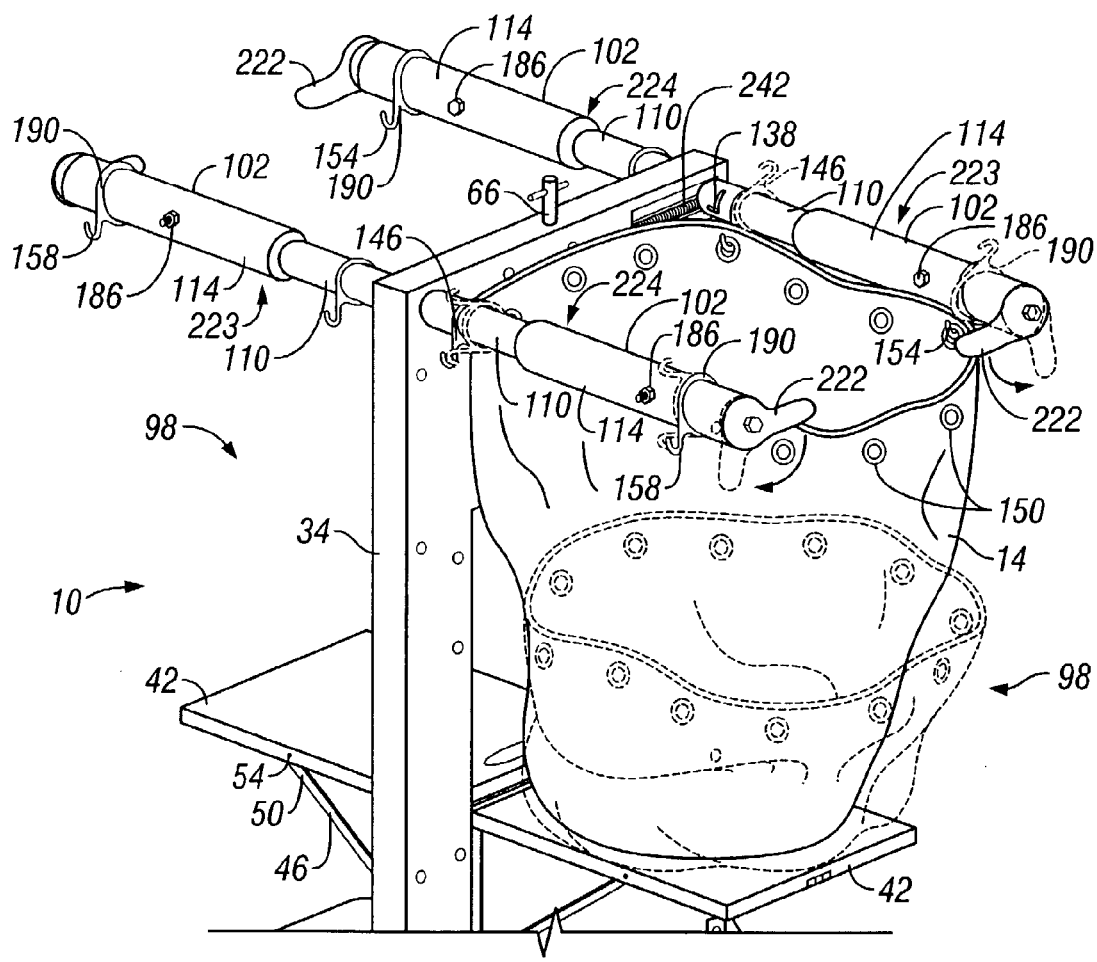
FIG. 4 is a perspective view of the support arms of FIGS. 1–3B, illustrating rotation of the support arms.

As shown in FIG. 4, the sack support arms 102 of each parcel receiving station 98 are rotatable to selectively support and remove a sack 14 whose eyelets 150 are engaged by the sack hooks 154 of the support arms 102 and whose weight is supported by either the platform 30 or the auxiliary support shelf 42. As previously described, the first slot 138 of the rotating portion 110 allows about 90-degrees of rotation of the rotating portion 110 and sliding portion 114. Also, the notch 142 in the first slot 138 provides a locking mechanism for the rotating portion 110 such that the rotating portion 110 is rotationally fixed relative to the base portion 106 when the first pin 134 engages the notch 142.

During operation, when a sack 14 is filled and rotated away from the chute 20, an operator first disengages the notches 142 of the rotating portions 110 from the first pins 134. To do this, the operator either pushes or pulls the handles 222, depending on the configuration of the notch 142. Since the sack hooks 154 of the support arms 102 are engaged with the eyelets 150 of the sack 14, and the relative position of the sliding portion 114 is fixed relative to the rotating portion 110, this action by the operator axially moves the notches 142 of the rotating portions 110 out of engagement with the first pins 134. The handles 222 are then manipulated by the operator to rotate both rotating and sliding portions 110, 114 of the sack support arms 102 to disengage the sack hooks 154 from the eyelets 150 of the sack 14. Typically, after about 90-degrees of rotation, and the handles 222 are substantially vertical, the sack hooks 154 disengage the eyelets 150 of the sack 14 and the sack 14 collapses to the platform 30 of the frame 22 or the auxiliary support shelf 42, depending on the height of the sack 14.

To insert an empty sack 14, the operator manipulates the handles 222 to rotate the sliding portion 114 and rotating portion 110 about 90-degrees back to the position where the handles 222 are substantially horizontal. The operator then pushes or pulls on the handles 222, which causes the notches 142 of the rotating portions 110 to engage the first pins 134. Finally, an empty sack 14 is removed from the storage hook 158, and the sack 14 is hung on the sack hooks 154 through the eyelets 150. When the other sack 14 is filled, the cart 10 is rotated to position the empty sack 14 to receive parcels 18 from the parcel sorting machine.

Figure 5:
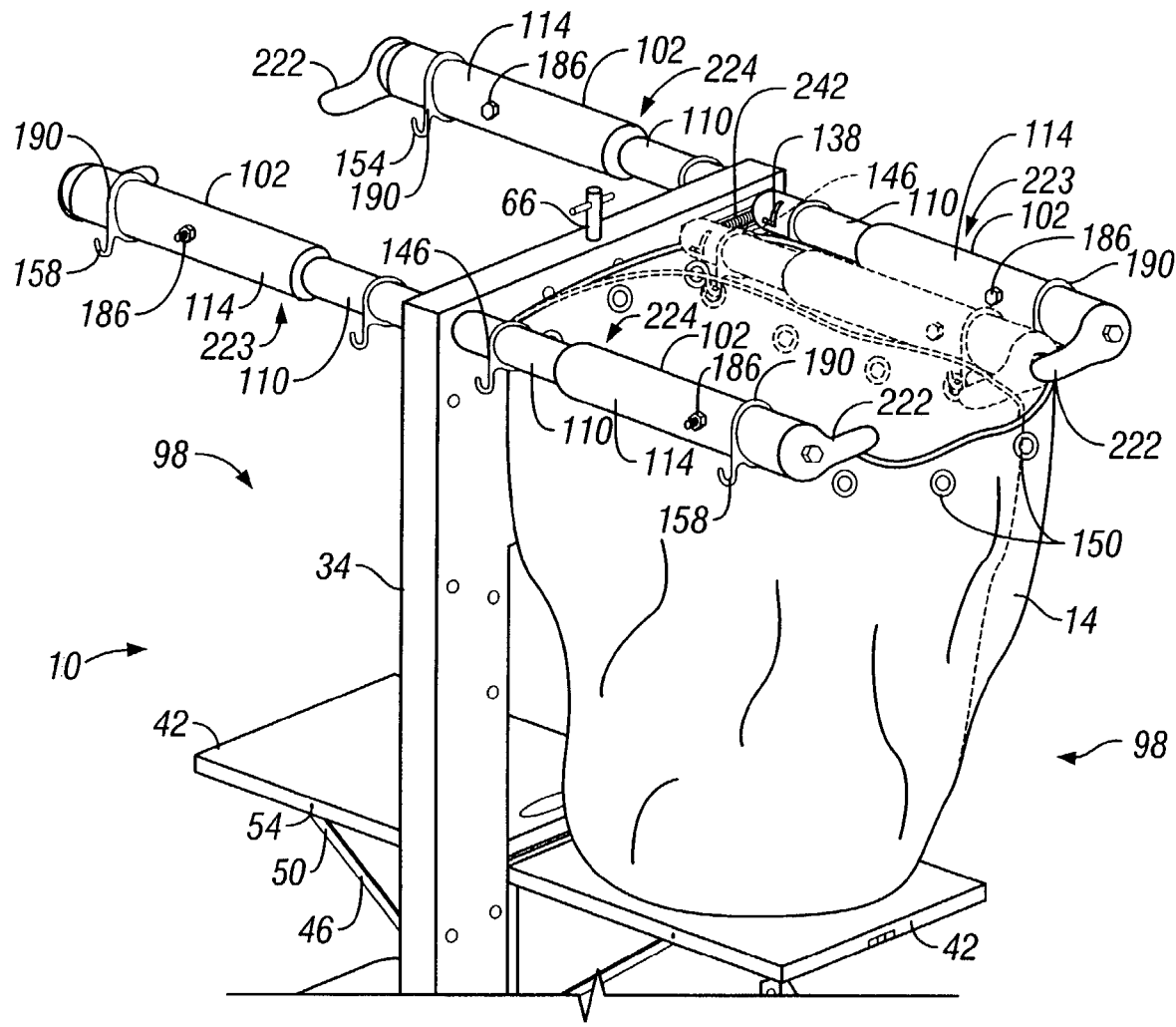
FIG. 5 is a perspective view of the support arms of FIGS. 1–3B, illustrating lateral adjustment of one of the support arms.

As shown in FIG. 5, one sack support arm 223 of each parcel receiving station 98 is laterally biased to provide lateral adjustment to the one sack support arm 223 to accommodate different size sack openings. The laterally biased sack support arm 223, in combination with a laterally fixed sack support arm 224, further provides a mechanism to maintain the sack opening when the sack hooks 154 are engaged with the eyelets 150 of the sack 14. As shown in FIG. 3, the base portion 106 of the laterally biased sack support arm 223 is welded to a metal carrier plate 226, whereby the carrier plate 226 slides within a metal track plate 230. Lubricants, such as oil, grease, and so forth, may be used between the contacting surfaces of the carrier plate 226 and track plate 230 to help decrease friction between the contacting surfaces. Alternatively, the base portion 106 of the laterally biased sack support arm 223 may be made of any material, and be fastened, glued, epoxied, welded, or integrally molded with the carrier plate 226, or any other method that securely mounts the base portion 106 to the carrier plate 226 may be used. The track plate 230 is inserted into the sheet metal wall 34 and welded therein. Alternatively, the track plate 230 may be press fit, fastened, glued, epoxied, welded, or integrally formed with the wall 34, or any other method that securely mounts the track plate 230 to the wall 34 may be used.

The carrier plate 226 includes an elongated slot 234 having a post 238 extending from the carrier plate 226 into the slot 234. The post 238 is sized such that a lateral compression spring 242 is engageable with the post 238. The track plate 230 includes a tab 246 extending substantially perpendicular to the track plate 230, whereby the tab 246 is sized and positioned to fit within the slot 234 when the carrier plate 226 slides within the track plate 230. As shown in FIG. 3, the compression spring 242 is sandwiched between the post 238 and the tab 246 such that the spring 242 biases the movement of the base portion 106 away from the tab 246. The slot 234 is sized to allow four inches of lateral adjustment of the laterally biased sack support arm 223. As a result, the laterally biased sack support arm 223 provides a total of eight inches of variation of the sack opening perimeter. Additionally, the compression spring 242 has a spring rate sized to provide at least 10 pounds of force to the laterally biased sack support arm 223 at its fully extended position. The at least 10 pounds of force substantially maintains the sack opening taut to provide the largest possible opening for the incoming parcels 18.

Figure 6:
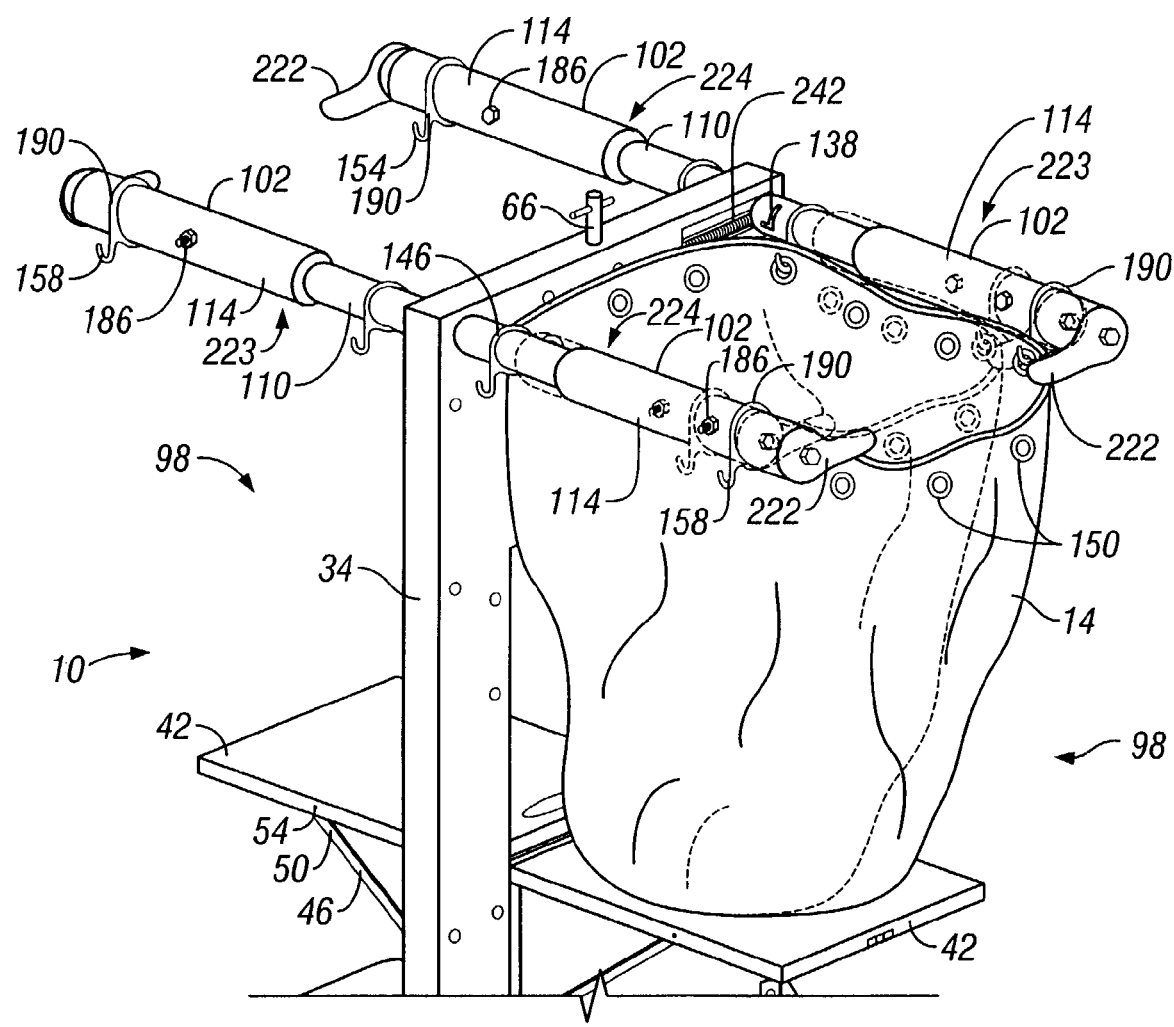
FIG. 6 is a perspective view of the support arms of FIGS. 1–3B, illustrating longitudinal adjustment of the support arms.
Figure 7:
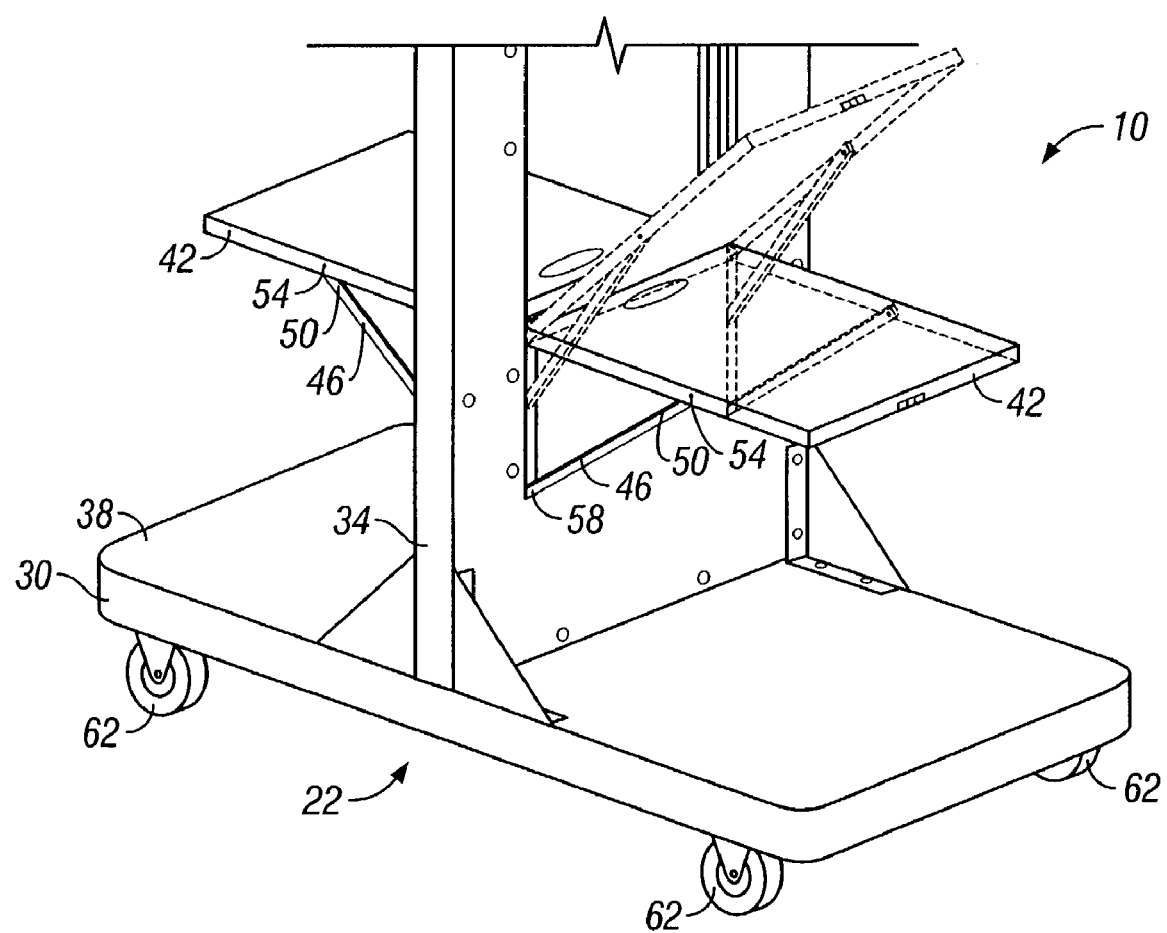
FIG. 7 is a perspective view of an auxiliary support shelf, illustrating its retraction into the cart.

As shown in FIG. 6, each sack support arm 102 of each parcel receiving station 98 is longitudinally biased to provide longitudinal adjustment to the sack support arm 102 to accommodate different size sack openings. The previously described spring pocket 210, compression spring 206, and spring bushing 214 provide the biasing force on the sliding portion 114 of the sack support arm 102, whereby the biasing force causes the sliding portion 114 to telescope away from the rotating portion 110. The second slot 182 in the rotating portion 110 is sized to allow four inches of longitudinal adjustment of the sliding portion 114 along the longitudinal axis 118. As a result, the longitudinally adjustable sack support arms 102 provide a total of eight inches of variation of the sack opening perimeter. When combined with the lateral adjustment, a total of 16-inches of adjustment is possible. More specifically, the cart 10 can support sacks 14 having an opening perimeter between about 28-inches and 44-inches. Similar to the lateral compression spring 242, the longitudinal compression spring 206 has a spring rate sized to provide at least 10 pounds of force to the sliding portion 114 at its fully extended position. The at least 10 pounds of force substantially maintains the sack opening taut to provide the largest possible opening for the incoming parcels 18.

To prepare the cart 10 for operation, a sack 14 is attached to each parcel receiving station 98 of the cart 10. Additionally, empty sacks 14 are hung from the storage hooks 158 in preparation for attachment to a parcel receiving station 98. Depending on the size of the sack opening, the sack support arms 102 are longitudinally adjusted and the laterally biased sack support arm 223 is laterally adjusted to provide a taut opening to the sack. Additionally, depending on the height of the sack 14, the auxiliary support shelf 42 is deployed to support the weight of the sack 14 (when filled). The cart 10 is then rotatably engaged with the parcel sorting machine, whereby the pivot pin 66 is engaged with the resiliently biased fingers 78 to define the central axis 26 of rotation of the cart 10. Then, the cart 10 is rotatably oriented to the parcel sorting machine such that one of the sacks 14 supported by the cart 10 is aligned to receive parcels 18 from the chute 20.

Once one of the sacks 14 is aligned to receive parcels 18 from the chute 20, the parcel sorting machine is activated to fill the sack 14 with parcels 18. Upon filling the sack 14, the cart 10 is rotated to remove the filled sack 14 from alignment with the chute 20, and further rotation of the cart 10 results in aligning an empty sack 14 with the chute 20. This action yields a sack changeover time of only a few seconds, compared to about one minute when using traditional devices and methods in the industry.

The filled sack 14 is then removed from the cart 10 once it is rotated away from the chute 20. To accomplish this, the handles 222 are manipulated to rotate both rotating and sliding portions 110, 114 of the sack support arms 102 to disengage the sack hooks 154 from the eyelets 150 of the sack 14. Typically, after about 90-degrees of rotation, the sack hooks 154 disengage the eyelets 150 of the sack 14, and the sack 14 collapses to the platform 30 of the frame 22 or the auxiliary support shelf 42, depending on the height of the sack 14. The filled sack 14 is removed from the cart 10, and an empty sack 14 (from the storage hooks) is inserted in place of the filled sack 14 using the reverse of the procedure outlined above. The above procedure is repeated after the sack 14 aligned with the chute 20 is filled.

I claim:

1. A cart comprising:
    a frame adapted to support at least two open-ended containers for receiving articles, the frame being rotatable about a central axis passing through the frame;
    a rotation mechanism coupled between the frame and a support surface that enables the frame to be rotated about the central axis; and
    at least one support arm selectively movable to support the container on the cart, wherein the at least one support arm has a first mounting portion engageable with a second mounting portion of the container to support the container, the at least one support arm being selectively rotatable to engage and disengage the first mounting portion and the second mounting portion.

2. The cart of claim 1, further comprising:
    a receiving station capable of supporting and releasing at least one container.

3. The cart of claim 1, wherein the at least one support arm is axially adjustable.

4. The cart of claim 1, wherein the at least one support arm is laterally adjustable.

5. The cart of claim 1, wherein the at least one support arm is selectively rotatable to release the container.

6. The cart of claim 1, wherein the rotation mechanism includes casters interconnected to the frame.

7. The cart of claim 1, further comprising at least one support shelf to support the container.

8. The cart of claim 1, wherein the support arm is laterally biased.

9. The cart of claim 1, wherein the support arm is axially biased.

10. The cart of claim 1, wherein the first mounting portion includes a hook.

11. The cart of claim 1, further comprising a handle coupled to the support arm.

12. A cart adapted to support containers, the containers adapted to receive items from a sorting station, the cart comprising:
    a frame including a central axis passing therethrough and including at least two receiving stations, each receiving station supporting at least one container, the frame being rotatable about the central axis to substantially align a receiving station with a sorting station;
    two support arms extending in each receiving station, at least one support arm being laterally adjustable and at least one support arm being axially adjustable;
    a first mounting portion coupled to the support arms to engage a second mounting portion of the container; and
    a rotation mechanism coupled between the frame and a support surface, wherein the support arms are selectively rotatable to engage and disengage the first mounting portion and the second mounting portion.

13. The cart of claim 12, further comprising at least one support shelf to support the container.

14. The cart of claim 12, wherein at least one of the support arms is laterally biased.

15. The cart of claim 12, wherein at least one of the support arms is axially biased.

16. The cart of claim 12, wherein the first mounting portion coupled to the support arms includes a hook.

17. The cart of claim 12, further comprising a handle coupled to at least one of the support arms.

* * * * *